(12) United States Patent
Bhattacharjee et al.

(10) Patent No.: US 11,176,575 B2
(45) Date of Patent: *Nov. 16, 2021

(54) DYNAMIC CONTENT AGGREGATION

(71) Applicant: Google LLC, Mountain View, CA (US)

(72) Inventors: Rajat Bhattacharjee, Mountain View, CA (US); Aranyak Mehta, Palo Alto, CA (US); Benyu Zhang, Fremont, CA (US); Vivek Raghunathan, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,954

(22) Filed: Sep. 9, 2019

(65) Prior Publication Data

US 2019/0392481 A1 Dec. 26, 2019

Related U.S. Application Data

(63) Continuation of application No. 15/066,826, filed on Mar. 10, 2016, now Pat. No. 10,417,661, which is a continuation of application No. 13/006,935, filed on Jan. 14, 2011, now abandoned.

(60) Provisional application No. 61/357,954, filed on Jun. 23, 2010.

(51) Int. Cl.
*G06Q 30/02* (2012.01)
*G06F 16/9535* (2019.01)

(52) U.S. Cl.
CPC ..... *G06Q 30/0256* (2013.01); *G06F 16/9535* (2019.01); *G06Q 30/0275* (2013.01); *G06Q 30/0277* (2013.01)

(58) Field of Classification Search
CPC ..................................................... G06Q 30/02
See application file for complete search history.

(56) References Cited

U.S. PATENT DOCUMENTS

| | | | |
|---|---|---|---|
| 6,119,101 A * | 9/2000 | Peckover | G06Q 30/02 705/14.17 |
| 7,617,205 B2 | 11/2009 | Bailey et al. | |
| 10,417,661 B2 | 9/2019 | Bhattacharjee et al. | |
| 2001/0034771 A1 | 10/2001 | Hutsch et al. | |
| 2002/0173971 A1 | 11/2002 | Stirpe et al. | |
| 2005/0149499 A1* | 7/2005 | Franz | G06F 16/3338 |
| 2006/0106767 A1 | 5/2006 | Adcock | |
| 2006/0122884 A1 | 6/2006 | Graham et al. | |
| 2006/0149622 A1 | 7/2006 | Baluja et al. | |
| 2006/0224554 A1 | 10/2006 | Bailey et al. | |
| 2006/0294084 A1* | 12/2006 | Patel | G06Q 30/02 |
| 2007/0079236 A1* | 4/2007 | Schrier | G06F 40/186 715/206 |
| 2007/0106610 A1 | 5/2007 | Forsythe et al. | |
| 2007/0150348 A1 | 6/2007 | Hussain et al. | |
| 2007/0208724 A1 | 9/2007 | Madhavan et al. | |

(Continued)

*Primary Examiner* — Vincent M Cao
(74) *Attorney, Agent, or Firm* — Fish & Richardson P.C.

(57) ABSTRACT

Information regarding display of selected content items in assigned slots is provided. The information is based on a selected template that includes areas for groups of slots for related content items, such as content items that are targeted to a common targeting object. Candidate content items, identified based on targeting or other distribution information, are assigned to selected slots to determine at least part of the information regarding display of the selected content items.

20 Claims, 12 Drawing Sheets

(56) References Cited

U.S. PATENT DOCUMENTS

2007/0239716 A1* 10/2007 Weininger ............ G06F 16/335
2008/0004962 A1   1/2008 Muthukrishnan et al.
2008/0306824 A1  12/2008 Parkinson
2009/0132340 A1*  5/2009 Demir .................... G06Q 30/02
                                                      705/7.29

* cited by examiner

FIG. 3A (con't.)

WEB IMAGES VIDEOS MAPS NEWS SHOPPING GMAIL MORE ▽     FAREWELLSPACEMAN@GMAIL.COM | WEB HISTORY | SETTINGS ▽ | SIGN OUT

GOOGLE [CHILDTOYZ_____] [SEARCH] ADVANCED SEARCH

WEB ⊞SHOW OPTIONS...     ↙312     RESULTS 1 - 10 OF ABOUT 3,960,000 FOR CHILDTOYZ. (0.13 SECONDS)

CHILDTOYZ
CHILDTOYZ - THE STUFFED ANIMAL THAT COMES ALIVE ONLINE IN CHILDTOYZ WORLD. KEEP YOUR PET HAPPY
AND HEALTHY AND BUILD A HOME FOR IT WITH OUR COOL FURNITURE.
WWW.CHILDTOYZ.COM/ - CACHED - SIMILAR ⌕ ⊞ ⊠
    CHILDTOYZ A TOY CO. WEBSITE    BIENVENUE A CHILDTOYZ, UN SITE...
    CHILDTOYZ                CUSTOMER SUPPORT
    ESTORE                     MEMBERSHIPS
    ENGLISH                    PARENTS AREA
    MORE RESULTS FROM CHILDTOYZ.COM >>

WELCOME TO CHILDTOYZ - A TOY CO. WEBSITE
CHILDTOYZ PETS ARE LOVABLE PLUSH PETS THAT EACH COME WITH A UNIQUE SECRET CODE. WITH IT, YOU
ENTER CHILDTOYZ WORLD WHERE YOU CARE FOR YOUR VIRTUAL PET, ...
WWW.CHILDTOYZ.COM/US_EN/-CACHED - SIMILAR ⌕ ⊞ ⊠

CHILDTOYZ - CLICK HERE FOR DRESS UP GAMES!
CDE IS THE BIGGEST FREE DRESS UP SITE ON THE INTERNET, WITH OVER 750 AWESOME DRESS UP GAMES!
CLICK HERE TO PLAY!
WWW.CARTOONDOLLEMPORIUM.COM/CHILDTOYZ.HTML - CACHED - SIMILAR ⌕ ⊞ ⊠

CHILDTOYZ PETS STORES, CHILDTOYZ FOR SALE. NEW CHILDTOYZ 2009 - NEW ...
VISIT THE WEB'S LARGEST CHILDTOYZ STORE ONLINE. BUY NEW CHILDTOYZ 2009. BUY SECURELY ONLINE
AND HAVE YOUR NEW WEBTOYZ TOYS IN A MATTER OF DAYS...
ASTORE.AMAZON.COM/CHILDTOYZ-PET-20- CACHED - SIMILAR ⌕ ⊞ ⊠

CHILDTOYZ - WIKIPEDIA THE FREE ENCYCLOPEDIA
CHILDTOYZ ARE TOY STUFFED ANIMALS THAT WERE ORIGINALLY RELEASED BY THE TOY CO. ON APRIL
29, 2005. THE TOYS ARE SIMILAR TO MANY OTHER SMALL PLUSH TOYS, ...
EN.WIKIPEDIA.ORG/WIKI/CHILDTOYZ - CACHED - SIMILAR ⌕ ⊞ ⊠

OCTOBER IS A GREAT MONTH FOR NEW CHILDTOYZ AND IT KEEPS GETTING BETTER. THE CHILDTOYZ PINK
COCKATOO HAS BEEN ANNOUNCED AS A BRAND NEW PET COMING IN OCTOBER ...
CHILDTOYZ - TIPS.COM/ - CACHED - SIMILAR ⌕ ⊞ ⊠

SPONSORED LINKS

┌─────────────────────────────┐
│ CHILDTOYZ    316A          │
│ SHOPPING DECISIONS MADE EASY AT │
│ BING CASHBACK! BING & DECIDE. │
│ BING.COM/CASHBACK            │
└─────────────────────────────┘ ← 314

↙313A
RELATED TO CHILDTOYZ TRADING CARDS:

CHILDTOYZ TRADING CARDS    316B
LOWEST PRICES! FAST SHIPPING
BUY CHILDTOYZ CARD PACKS AND BOXES
WWW.BLOWOUTCARDS.COM

BUY CHILDTOYZ TRADING CARDS    316C
FULL TIME TOY CO. WORLD STORE-
PACKS, SINGLES, FEATURE CODE CARDS
WWW.BBTOYSTORE.COM

CHILDTOYZ TRADING CARDS    316D
SAVE ON CHILDTOYZ TRADING CARDS!
QUALIFIED ORDERS OVER $25 SHIP FREE
AMAZON.COM   ← 315A

⊞ SEE MORE ADS FOR CHILDTOYZ TRADING CARDS ← 317A

↙313B
RELATED TO CHILDTOYZ PETS

TO FIG. 3B (con't.)

FIG. 3B

FROM FIG 3B

CHILDTOYZ JR.
WHAT IS CHILDTOYZ JR.? CHILDTOYZ JR. PETS ARE LOVABLE PLUSH ANIMALS THAT EACH COME WITH A UNIQUE PET CODE. WELCOME TO CHILDTOYZ JR. HOME. - NEW MEMBER....
WWW.CHILDTOYZJR.COM/ - CACHED - SIMILAR ⌕ ⊞ ✕

CHILDTOYZ INSIDER -- CHILDTOYZ NEWS, INFO, RECIPES & FORUMS!
SEP 11, 2009 ... FREE CHILDTOYZ, SECRET RECIPES, CHAT FORUM, NEWS, TIPS AND TRICKS AND GAME STRATEGIES FOR CHILDTOYZ WORLD.
WWW.CHILDTOYZINSIDER.COM/ - 54 MINUTES AGO - CACHED - SIMILAR ⌕ ⊞ ✕

AMAZON.COM: CHILDTOYZ: TOYS & GAMES
BESTSELLERS IN CHILDTOYZ. CHILDTOYZ BROWN SPRINGER SPANIEL OUR PRICE: $6.70. CHILDTOYZ HM222 SILVERSOFT CAT PLUSH ANIMAL. OUR PRICE: $6.20. CHILDTOYZ RACCOON...
WWW.AMAZON.COM/CHILDTOYZ/B?IE=UTF8&NODE... - CACHED - SIMILAR ⌕ ⊞ ✕

THE #1 WEBSITE FOR EVERYTHING ABOUT CHILDTOYZ
CHILDTOYZ HUB IS THE FUNNEST PLACE TO BE FOR NEWEST INFORMATION ON THE WORLD OF CHILDTOYZ AND LIL TOYZ.
WWW.CHILDTOYZHUB.COM/ - CACHED - SIMILAR ⌕ ⊞ ✕

NEWS RESULTS FOR CHILDTOYZ
RESTAURANT TO OFFER EXCLUSIVE CHILDTOYZ PET - 1 DAY AGO
OPOSSUM IS THE NEW ULTRA-SOFT PLUSH TOY FROM CHILDTOYZ AND WILL BE AVAILABLE ONLY AT RESTAURANT STARTING ON SEPTEMBER 11TH. "IT IS A TREMENDOUS HONOR TO ...
PR-USA.NET (PRESS RELEASE) - 25 RELATED ARTICLES>

SEARCHES RELATED TO: CHILDTOYZ
CHILDTOYZ CHEATS    FUTURE CHILDTOYZ    CHILDTOYZ CODES    CHILDTOY.COM TOY CO. WEBSITE
CHILDTOYZ RECIPES   CHILDTOYZ LOGIN     CHILDTOYZ CLUB     CHILDTOYZ 2008

GOOOOOOOOOOGLE
1 2 3 4 5 6 7 8 9 10    △ NEXT

315B → WE SELL CHILDTOYZ PETS HERE  316E
FULL TIME TOY CO. CHILDTOYZ WORLD STORE
-ALL NEW PLUSH, CHARMS, CARDS & MORE
WWW.BBTOYSTORE.COM 311
317B

CHILDTOYZ PETS  316F
FIND CHILDTOYZ PETS
AT WEBCRAWLER.COM
WWW.WEBCRAWLER.COM
⊞ SEE MORE ADS FOR CHILDTOYZ TRADING PETS

313C → RELATED TO CHILDTOYZ CHARMS:

315C
317C

CHILDTOYZ CHARMS
BID ON CHILDTOYZ CHARMS NOW!
FIND STUFFED ANIMALS.  316G
WWW.EBAY.COM

CHILDTOYZ CHARMS  316H
10,000+ CHILDTOYZ CHARMS
SHOP, COMPARE AND SAVE AT PRONTO.
CHARM.PRONTO.COM
⊞ SEE MORE ADS FOR CHILDTOYZ CHARMS.

310

⊞ ADD A RESULT - SEE ALL MY SEARCHWIKI NOTES - SEE ALL NOTES FOR THIS SEARCHWIKI - LEARN MORE

[CHILDTOYZ]  [SEARCH]

SEARCH WITHIN RESULTS - LANGUAGE TOOLS - SEARCH HELP - DISSATISFIED? HELP US IMPROVE - TRY GOOGLE EXPERIMENTAL
GOOGLE HOME - ADVERTISING PROGRAMS - BUSINESS SOLUTIONS - PRIVACY - ABOUT GOOGLE

FIG. 3B(con't.)

FIG. 3E

DYNAMIC CONTENT AGGREGATION

CROSS-REFERENCE TO RELATED APPLICATION

This application is a continuation application of and claims priority to U.S. patent application Ser. No. 15/066,826, now U.S. Pat. No. 10,417,661, filed on Mar. 10, 2016, which application claims priority to U.S. patent application Ser. No. 13/006,935, now abandoned, filed on Jan. 14, 2011, which application claims priority to U.S. Provisional Application No. 61/357,954, filed on Jun. 23, 2010. The disclosure of the prior applications are considered part of and are incorporated by reference in the disclosure of this application.

BACKGROUND

This disclosure generally relates to distributing content items.

A search engine results page provides a user of a search engine with a list of search results that are returned by the search engine in response to a search query. Search engine results pages may include content items, such as advertisements, that are relevant to the search query or selected for another reason. Advertisements, which are also referred to as "sponsored listings," are typically displayed on the right hand side of a search engine results page or directly above the search results, although other locations are possible.

The user, the search engine provider, and the advertiser may all benefit when the user selects or otherwise interacts with an advertisement that is displayed on the search engine results page. When the search engine results page includes advertisements that are not interesting to the user, the user may become annoyed, discouraged, or dissatisfied and quickly navigate away without selecting or interacting with an advertisement. As a result, the opportunity for the user, the search engine provider, and the advertiser to benefit may be reduced.

SUMMARY

In general, the subject matter described in this disclosure relates to selecting and providing content items (e.g., advertisements) that are relevant to a user. In some implementations, an advertisement selector engine selects candidate advertisements that are targeted to an initial query (where the query can include one or more query terms) that the user has submitted. The advertisement selector also selects candidate advertisements that are targeted to one or more additional queries that are automatically derived from the initial query. An auction engine may dynamically perform an analysis of information regarding candidate advertisements, such as distribution information provided by associated advertisers, to select one or more subsets of the candidate advertisements. For example, a subset of the advertisements targeted to the initial query and a subset of the advertisements targeted to each of the additional queries can be selected. The search engine returns search results that are used to assemble a search engine results page that, among other things, includes an advertisement box that references the initial query and advertisements from the subset that have been selected for the initial query, and one or more advertisement boxes that reference the additional queries and advertisements from the subset that have been selected for the additional queries.

As used in this disclosure, a "search query" (also including, for example, a "voice query" when spoken instead of initially input as text or through other input techniques) includes one or more query terms that a user submits to a search engine when the user requests the search engine to execute a search for information, where a "term" or a "query term" includes one or more whole or partial words, characters, or strings of characters. Among other things, a "result" (or a "search result") for the search query includes a Uniform Resource Identifier (URI) that references a resource that the search engine determines is responsive to the search query. The search result may include other content items, such as a title, a preview image, a user rating, a map, a set of directions, a description of a corresponding resource, and/or a snippet of text that has been automatically or manually extracted from, or is otherwise associated with, the corresponding resource.

In one general aspect, a process includes accessing, for a first object, information regarding a first set of candidate content items that are available for distribution in an area of a display associated with the first object, the candidate content items of the first set of candidate content items being selected based at least in part on distribution information associated with each content item and the first object, access, for a second object, information regarding a second set of candidate content items that are available for distribution in an area of the display associated with the second object, the candidate content items of the second set of candidate content items being selected based at least in part on distribution information associated with each content item and the second object, selecting, by one or more processors, a template for a display of content items, the template including multiple areas for display of groups of content items, each area of the template including at least one slot, assigning, by one or more processors, a content item to each slot of the selected template, and providing display information for use in generating a display including the content items in their respective assigned slots of the display areas according to the template.

Implementations may include one or more of the following features. For example, selecting includes identifying valid templates based at least in part on the information regarding the first set of candidate content items and the information regarding the second set of candidate content items. Selecting further includes identifying templates that meet criteria of one or more business rules regarding content item display preferences. Assigning includes ranking the candidate content items of the first set of candidate content items, ranking the candidate content items of the second set of candidate content items, assigning the first set to a first area of the template, and assigning the second set of candidate content items to a second area of the template. Selecting includes associating content items to slots of a first template and a second template, scoring the first template based at least in part on the distribution information associated with the content items assigned to the slots of the first template, and scoring the second template based at least in part on the distribution information associated with the content items assigned to the slots of the second template. The distribution information includes bid information regarding a price a provider of a content item is willing to pay associated with distribution of the content item. Selecting further includes selecting the template based on the scores of the first template and the second template. The content items include advertising content.

Particular embodiments of the subject matter described in this specification may be implemented to realize none, one or more of the following advantages. Advertisements presented to users on search engine results pages are likely to be more interesting to the user, improving the overall search experience. The advertiser may increase their sales opportunities, and the search engine provider may receive additional revenue, as more users select the advertiser's advertisements. The search engine may generate fewer search engine results pages that include no advertisements. By displaying advertisements relating to multiple query terms, ad relevance and ad response rates may be improved. Users that might not otherwise manually refine query terms may be encouraged to interact with the search engine through a visual query refinement mechanism.

The details of one or more embodiments of the subject matter described in this disclosure are set forth in the accompanying drawings and the description below. Other potential features, aspects, and advantages of the subject matter will become apparent from the description, the drawings, and the claims.

BRIEF DESCRIPTION OF DRAWINGS

FIGS. 3A to 3E show example search engine results pages.

Like reference symbols in the various drawings indicate like elements.

DETAILED DESCRIPTION

Briefly, a system selects and provides one or more content items (e.g., advertisements or "ads") that are relevant to a user of the system. Reference will be made in the following materials to providing advertisements, however other forms of content items can be provided. In some implementations, to accomplish this, an advertisement selector engine may select candidate advertisements that are targeted to an initial query that the user has submitted, as well as candidate advertisements that are targeted to one or more additional queries that are automatically derived from the initial query. An auction engine may dynamically perform a competition, i.e., an auction, among advertisers associated with candidate advertisements, to select one or more subsets of the candidate advertisements to include in an advertisement block.

Figure 1:
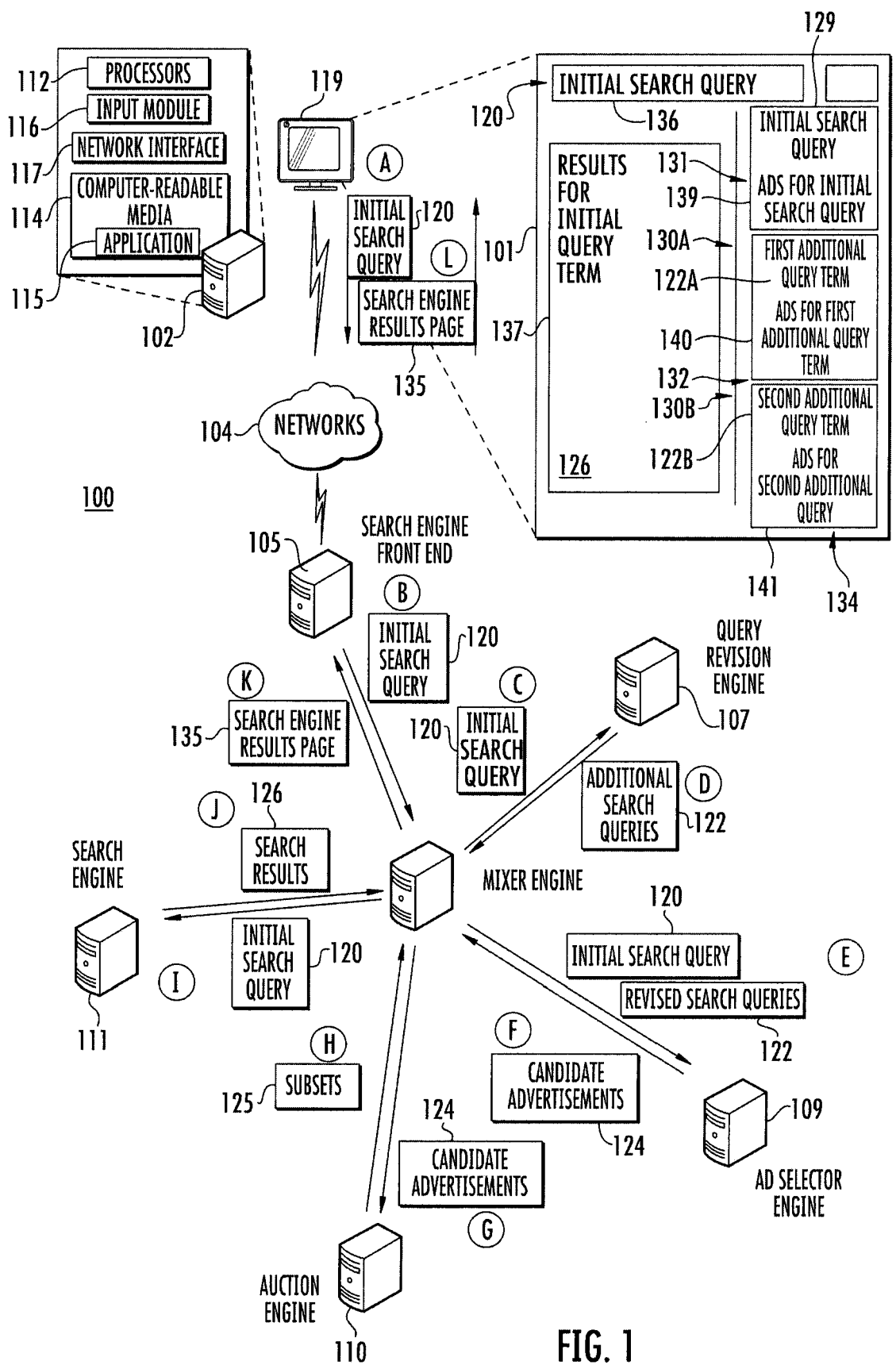
FIG. 1 is a diagram of a system for distributing content items on a search engine results page.

FIG. 1 is a diagram of an example system 100 that can provide content items on a search engine results page 101. FIG. 1 also illustrates a flow of data within the system 100 during states (a) to (m), where the states (a) to (m) may occur in the illustrated sequence, or they may occur in a sequence that is different than is illustrated.

The search engine 111 returns search results that are used by a mixer engine 106 to assemble the search engine results page 101. Among other things, the search engine results page 101 references an initial query 120 (e.g., using reference 129) and additional queries 122 (e.g., using reference 130), and that includes advertisements 131 from a subset 125 that have been selected for the initial query and advertisements 132, 134 from the subset 125 that have been selected for the additional queries 122.

In more detail, the system 100 includes a client device 102 that communicates over one or more networks 104 with a search engine front end (or a "gateway server") 105, a mixer engine 106, a query reviser engine 107, an advertisement selector engine 109, an auction engine 110, a search engine 111, and, optionally, other engines. As used in this disclosure, an "engine" (or "software engine") refers to a software-implemented input/output system that provides an output that is different than the input. An engine may be an encoded block of functionality, such as a library, a platform, Software Development Kit ("SDK") or an object. The networks 104 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The client device 102, the search engine front end 105, the mixer engine 106, the query reviser engine 107, the advertisement selector engine 109, the auction engine 110, and the search engine 111 may each be implemented on any appropriate type of computing device (e.g., servers, mobile phones, tablet computers, music players, e-book readers, laptop or desktop computers, PDAs, smart phones, or other stationary or portable devices) that includes one or more processors and computer readable media. Among other components, the client device 102 includes one or more processors 112, computer readable media 114 that store software applications 115 (e.g., a browser or layout engine), an input module 116 (e.g., a keyboard or mouse), communication interface 117, and a display 119. The computing device or devices that implement the search engine front end 105, the mixer engine 106, the query reviser engine 107, the advertisement selector engine 109, the auction engine 110, and the search engine 111 may include similar or different components.

Two or more of the search engine front end 105, the mixer engine 106, the query reviser engine 107, the advertisement selector engine 109, the auction engine 110, and the search engine 111 may be implemented on the same computing device, or on different computing devices. Because the search engine results page 101 is generated based on the collective activity of the search engine front end 105, the mixer engine 106, the query reviser engine 107, the advertisement selector engine 109, the auction engine 110, and the search engine 111, the user of the client device 101 may refer to these engines collectively as a "search engine." In this disclosure, however, the term "search engine," refers to the search engine 111, and not the collection of engines, as the "search engine," since the search engine 111 identifies the search results in response to the user-submitted search query.

In general, the search engine front end 105 receives queries from client devices 102, and routes the queries to the appropriate engines so that search engine results pages may be generated. In some implementations, routing occurs by referencing static routing tables, or routing may occur based on the current network or processing load of an engine, so as to accomplish a load balancing function. The search engine front end 105 also provides the resulting search engine results pages to the respective client devices 102. In doing so, the search engine front end 105 acts as a gateway, or interface between client devices and the search engine 111.

The mixer engine 106 stores and collates data that is generated by the various engines, and generates search engine results pages using this data. The mixer engine 106 determines the sequence in which to request data from various engines, and submits formatted requests and receives responses from the various engines according to the desired sequence. The sequence may be determined from a sequence table or chart, or from rules that specify how particular types of queries are to be processed, and that identify the various engines that are to generate portions of the data that make up a search engine results page.

The query reviser engine 107 applies query terms, i.e., the initial query, to various query revision models to generate additional queries that, in some implementations, match a same or a similar context as an input query. Several example query revision strategies which may be used by the query reviser engine 107 are described in U.S. Pat. No. 7,617,205, issued Nov. 10, 2009, which is incorporated by reference in the entirety (including its FIGS. 1A and 1B, which are incorporated by reference in particular), and U.S. Pat. App. Pub. No. 2006/0224554, published Oct. 5, 2006, which is incorporated by reference in the entirety (including its FIGS. 1A and 1B, which are incorporated by reference in particular).

In some implementations, the additional queries are relevant to the initial query, yet at the same time the additional queries may be required to be diverse with each other. Additional details of query selection are described below. In other implementations, additional queries are generated by the query reviser engine 107 before the initial query 120 is received.

The advertisement selector engine 109 selects candidate advertisements that are relevant to a query. This disclosure refers to an advertisement being "targeted" to a query when, for example, the advertisement is associated with a list of keywords that match one or more portions of the query. Accordingly, selecting a candidate advertisement that is targeted to a query may include generating n-grams from the query, and accessing a look-up table that cross-references n-grams with advertisements that are targeted to, or are otherwise associated with, a particular n-gram.

The mixer engine 106 may filter the candidate advertisements 124 before identifying the candidate advertisements to the auction engine 110. For instance, the mixer engine 106 may filter duplicate advertisements, too many advertisements from the same advertiser, advertisements that have a low distribution schedule satisfaction score or interest score, black-listed advertisements, advertisements that are determined to be inappropriate for the user, advertisements that the user has indicated in user preference information that they do not want to be displayed, too many advertisements for the same query term, or other advertisements.

When an insufficient number of advertisements are selected, i.e., where the number of advertisements selected for a particular query does not satisfy a predetermined or dynamically determined threshold number of selected advertisements (e.g., "0", or "3"), the advertisement selector engine 109 may select additional advertisements. For example, the advertisement selector engine can broaden the advertisement selection parameters. Similarly, when too many advertisements are selected, i.e., where the number of advertisements selected for a particular query exceeds a different predetermined or dynamically determined threshold number of selected advertisements (e.g., "10", or "100"), the advertisement selector engine 109 may filter the selected advertisements, for example by narrowing the advertisement selection parameters. The query reviser engine 107 may also filter the candidate additional queries before identifying the additional queries to other components of the system in an attempt to filter out unhelpful suggestions prior to identifying advertisements.

The auction engine 110 selects one or more subsets 125 of the candidate advertisements 124. For example, for each query terms, the auction engine 110 may analyze information regarding the candidate advertisements, i.e., perform an auction, in real-time in response to receiving the candidate advertisements 124, to select the top n advertisements for each query (i.e., the initial query and each additional query). Selecting a subset of the candidate advertisements may include selecting the same number of advertisements for each query, selecting different numbers of advertisements for each query, or determining for a one or more particular query that no advertisements should be selected. In some implementations, because the additional queries that were used to select the advertisements are diverse, and because the advertisement selector engine 109 may filter the candidate advertisements 124, the candidate advertisements 124 in the subset 125 of advertisements may also be diverse.

The search engine 111 searches for information that is accessible on the networks 104, thereby generating search results. The search engine 111 may perform a search using the initial query 120 only, using the initial query 120 and one or more of the additional queries 122, or using the initial query 120 and other data.

For privacy protection, any historical, behavioral or other data gathered can be made on an opt-in basis. Gathered data can be anonymized by various means. For example, the search engine 111 or query reviser engine 107 can provide additional query suggestions that are both relevant to the user's history while also protecting the user's privacy. For example, search history data can be anonymized for privacy protection, so that the data, if compromised, cannot be associated with a particular user or user identifier. Various anonymization processes, such as hashing, encryption and obfuscation techniques, can be used to ensure that subject privacy is protected.

In FIG. 1, a user of the client device 102 submits an initial search query 120 to the search engine front end 105 over the networks 104, during state (a). The user may submit the initial search query 120 by initiating a search dialogue on the client device 102, speaking or typing the terms of the initial search query 120, and then pressing a search initiation button or control on the client device 102. The client device formulates the initial query 120, and transmits the initial search query 120 over the networks 104.

Although this disclosure refers to the initial query 120 as an "initial" query, such reference is merely intended to distinguish this query from other queries, such as the additional, alternative, revised or suggested queries that are described below with respect to states (d) to (m). To be sure, the designation of the initial query 120 as "initial" is not intended to require the initial query 120 to be the first query that is entered by the user, or to be a query that is manually entered. For example, the initial query 120 may be the second or subsequent query entered by the user, or the initial query 120 may be automatically derived (e.g., by the query reviser engine 107) or may be modified based upon prior queries entered by the user, location information, and the like.

Furthermore, although state (a) describes an example where a user submits a search query, in other examples another type of request may be issued or submitted, such as a request for an advertisement. In a syndication example, an advertisement request may result in an advertisement block being sent to a user to be included on a page of content or otherwise included in or with other content.

During state (b), the search engine front end 105 receives the initial query 120, and communicates the initial query 120 to the mixer engine 106. The search engine front end 105 may also append a flag to the initial query 120 to indicate that multiple advertisement blocks are to be included in the search engine results page 101. Alternatively, the mixer engine 106 may assign such a flag, or may attempt to generate advertisement blocks for all queries.

The mixer engine 106 obtains the initial query 120 and, during state (c), transmits the initial query 120 to the query reviser engine 107. The mixer engine 106 stores the initial query 120 and information identifying the client device 102, so that the resulting search engine results page 101 may be transmitted back to the client device 102.

During state (d), the query reviser engine 107 generates one or more additional queries 122 that relate to the initial query 120, and transmits the additional queries 122 to the mixer engine 106. In some implementations, the additional queries may be selected based the relevance of the additional queries to the initial query 120, based on an extent to which the selected additional queries are diverse with each other, and/or based on the commerciality of the additional queries, i.e., the business value of the additional queries to the search engine provider. Generating additional queries may include generating candidate additional queries, and selecting a subset of the candidate additional queries based on any number of factors, including relevancy, diversity and/or commerciality. The mixer engine 101 stores information identifying the initial query 120 and the additional queries 122.

During state (e), the mixer engine 106 transmits the initial search query 120 and the additional queries 122 to the advertisement selector engine 109. The advertisement selector engine 109 selects one or more candidate advertisements that are targeted to the initial search query 120, and one or more candidate advertisements that are targeted to each of the additional queries 122. For example, the advertisement selector engine 109 may select one or more candidate advertisements 124 that are targeted to each of the additional queries 122, where some of the selected advertisements 124 may be targeted to more than one of the queries. The candidate advertisements for each query may be identified as candidates based on, for example, relevance to the query, advertisement quality, non-duplicative quality of the advertisement or advertiser, and/or a threshold number of advertisements to be selected as candidates. During state (f), the advertisement selector engine 109 transmits the selected advertisements 124, or information referencing the selected advertisements 124, to the mixer engine 106. The mixer engine 106 stores information referencing the selected advertisements 124.

During state (g), the mixer engine 106 transmits the selected advertisements, or information referencing the selected advertisements, to the auction engine 110. The auction engine 110 selects one or more subsets 125 of the advertisements using an auction such as, for example, a modified second price auction determining bids based on factors such as but not limited to advertiser maximum bid amounts, ad quality, ad click through rates, and, during state (h), transmits the advertisements of the subsets 125, or information referencing the advertisements of the subset 125, to the mixer engine 106. The mixer engine 106 stores information referencing the advertisements of the subset 125.

During state (i), the mixer engine 106 transmits the initial query 120 and, optionally, the additional queries 122 to the search engine 111. The search engine 111 generates search results that it identifies as being relevant to the initial query 120 and, if provided, one or more of the additional queries 122. In some implementations, during state (j), the search engine transmits the search results 126 to the mixer engine 106, which generates the search engine results page 101 that includes a reference 129 to the initial query 120 and references 130A-B to the additional queries, and that includes advertisements 131 from the subset 125 that are targeted to the initial query 120, advertisements 132 from the subset 125 that are targeted to a first additional query 122A, and advertisements 134 from the subset 125 that are targeted to a second additional query 122B.

The mixer engine 106 generates the search engine results page 101 using the information stored during states (b) to (k). In some implementations the search results may be generated while or before the auction engine 110 generated the subsets 125.

During state (k), the mixer engine 106 transmits code 135 (e.g., HyperText Markup Language code or eXtensible Markup Language code) for the search engine results page 101 to the search engine front end 105 which, during state (1), transmits the code 135 to the client device 102 over the networks 104, so the client device 102 can display the search engine results page 101.

The client device 102 invokes the code 135 (e.g., using a layout engine) and, as a result, displays the search engine results page 101 on the display 119. The initial query 120 is displayed in a query box (or "search box") 136, located for example, on the top of the search engine results page 101, and the search results 126 are displayed in a search results block 137, for example on the left hand side of the search engine results page 101. In some implementations, the right hand side of the search engine results page 101 defines an advertising region, including the reference 129 to the initial query 120, the reference 130A to the first additional query 122A, and the reference 130B to the second additional query 122B.

A first advertisement block 139 includes the reference 129 to the initial query 120 and the advertisements 131 of the subset 125 that are targeted to the initial query 120. A second advertisement block 140 includes the reference 130A to the first additional query 122A and the advertisements 132 of the subset 125 that are targeted to the first additional query 122A. A third advertisement block 141 includes the reference 130B to the second additional query 122B and the advertisements 134 of the subset 125 that are targeted to the second additional query 122B.

The references 129, 130 may be textual or graphical references, or the references 129, 130 may include hyperlinks that, when selected, cause the client device 102 to submit a new initial search query that includes, as a query term(s), the query associated with the hyperlink. In doing so, a reference 130 to an additional query 122 may be used to initiate a new search query using the additional query 122.

Figure 2A:
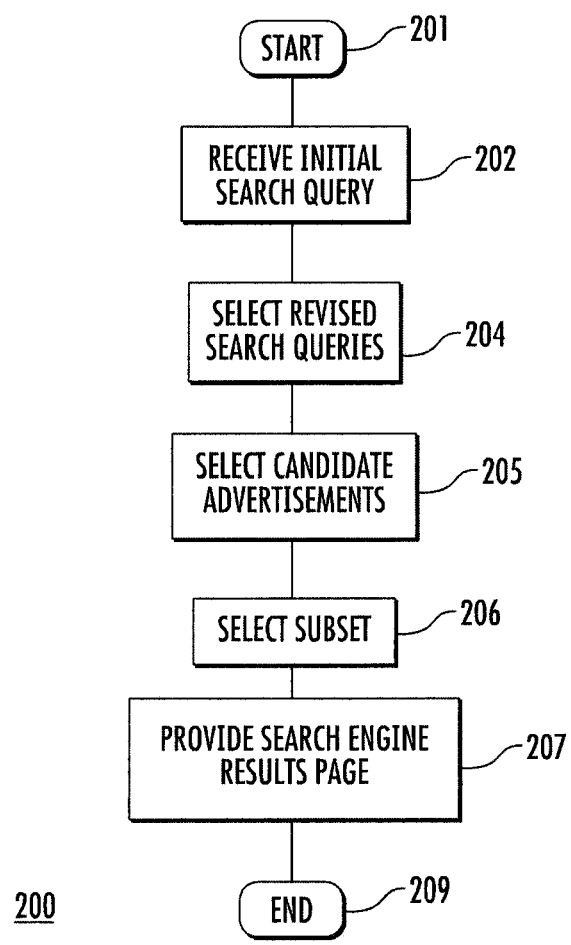
FIGS. 2A and 2B are flowcharts of example processes.

FIG. 2A is a flowchart of an example process 200. Briefly, the process 200 includes receiving an initial query, selecting one or more additional queries that relate to the initial query, selecting one or more advertisements that are relevant to the initial query, and one or more advertisements that are relevant to each additional query, selecting a subset of the advertisements, and providing a search engine results page that includes a reference to the initial query and to each additional query, and that includes advertisements from the subset that are targeted to the initial query, and advertisements from the subset that are targeted to each additional query.

In more detail, when the process 200 begins (201), an initial query is received (202). The initial query may be included in a search query (e.g., a text-based query, a voice query, or an image query) that the user submits through a client device, such as a desktop computer or a smart phone. Other data, such as context data, browser header data previous user queries, location data, user interest data, web history, and the like, may also be received with the initial query.

As discussed above, for privacy protection, any historical, behavioral or other data gathered can be made on an opt-in basis. Gathered data can be anonymized by various means. For example, the search engine 111 or query reviser engine 107 can provide additional query suggestions that are both relevant to the user's history while also protecting the user's privacy. For example, search history data can be anonymized for privacy protection, so that the data, if compromised, cannot be associated with a particular user or user identifier. Various anonymization processes, such as hashing, encryption and obfuscation techniques, can be used to ensure that subject privacy is protected.

One or more additional queries that relate to the initial query are selected (204). Revised query terms may be obtained by applying an initial query to a query revision model that identifies additional queries that match a same context as the initial query. For example, additional queries may be obtained by applying a synonym model which replaces portions of the initial query with synonyms of those portions.

Selecting additional queries may include generating multiple candidate additional queries, and filtering or otherwise excluding particular candidate additional queries. For instance, as a result of applying a semantic drift detection process to a particular candidate additional query, a query reviser engine may determine that semantic drift has occurred, and the particular candidate additional query may be filtered. Duplicate candidate additional queries, candidate additional queries that do not exhibit sufficient diversity or commerciality i.e., as reflected in a diversity or commerciality score or other candidate additional queries may also be filtered when selecting additional queries.

In some implementations, one or more advertisements that are relevant to the initial query are selected, as are one or more advertisements that are relevant to each additional query (205). Selecting an advertisement may include selecting advertisements that are associated with keywords that make up the query, and/or filtering advertisements that are unlikely to be selected by the user (e.g., duplicate or inappropriate advertisements).

A subset of the advertisements is selected (206). Selecting the subset may include selecting a number n of advertisements to be shown in a display block for each query (e.g., "3" for each query, or "1" for the initial query and "2" each for the additional queries), and selecting, as the subset, the n advertisements that have the highest quality. Other criteria can be used, such as advertisements whose advertisers have bid the highest amount of money to be displayed on the search engine results page. For example, the advertisements that have the highest effective ad ranking taking into account advertiser maximum bid (typically in cost-per-click terms), ad quality, ad click-through-rate (such as for each candidate ad relative to the next highest bid ad), and the like for each candidate ad in the subset of advertisements selected for potential display for a particular query. The selection of an advertisement for one query may affect the selection of an advertisement for another query, for example to exclude duplicate advertisements or advertisements from the same advertiser on the same search engine results page.

A search engine results page is provided that includes a reference to the initial query and to each additional query, and that includes advertisements from the subset that are targeted to the initial query, and advertisements from the subset that are targeted to each additional query (207), thereby ending the process 200 (209). The reference to each query may be a textual reference, or may be a hyperlink that, when selected, submits a new search query using a query (e.g., the terms) that is (are) identified by the hyperlink. A result may also be a script or link that activates a web-based application (including a specialized search application such as a map search, product search, video playback, Adobe Flash or HTML5 content, and the like), or client software when authorized by the user. The references and advertisements may be displayed in an advertising region of the search engine results page, such as along the bottom or the right hand side of the search engine results page.

In some implementations, the references to the initial query and to each additional query are displayed, but no advertisements are displayed for the initial query, or for one or more of the additional queries. In such implementations, a control on the search engine results page may be selected by the user to cause some advertisements, or additional advertisements, to be displayed. In some implementations, advertisements are displayed for the initial query and for the additional queries, but no reference is displayed for the initial query, or for one or more of the additional queries.

Figure 2B:
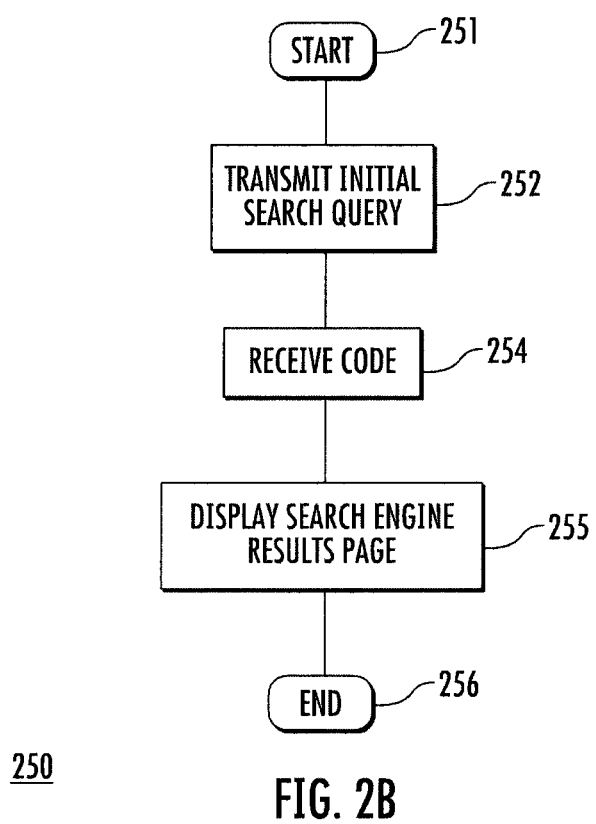

FIG. 2B is a flowchart of an example process 250. Briefly, the process 250 includes transmitting, by a client device, an initial query, receiving, by the client device, code for a search engine results page that includes a reference to the initial query and to one or more additional queries that relate to the initial query, and that further includes one or more advertisements that are relevant to the initial query, and one or more advertisements that are relevant to each additional query, and displaying, by the client device, the search engine results page.

In more detail, when the process 250 begins (251), a client device transmits an initial query (252). The search query may be transmitted over a network, for example when the user enters text into a query box on the user interface of the client device, and selects a control to submit the initial query. Alternatively, the initial query may be submitted without requiring a user interaction, for example when the client device recognizes a query term from the speech of a user, or uses the current location of the mobile device as a query term, and automatically submits the initial query to the search engine to obtain information for display before the user asks for it.

The client device receives code for a search engine results page that includes a reference to the initial query and to one or more additional queries that relate to the initial query, and that further includes one or more advertisements that are relevant to the initial query, and one or more advertisements that are relevant to each additional query (254). The code may be markup language code, such as HTML or XML code, that may be interpreted by a layout engine or a browser. The client device displays the search engine results page (255), thereby ending the process 250 (256).

FIGS. 3A to 3E show example search engine results pages 300, 310, 320, 330, and 340, respectively. The search engine results pages 300, 310, 320, 330, and 340 illustrate several ways in which the references to the queries and the various respective advertisements for each query may be arranged.

Figure 3A:
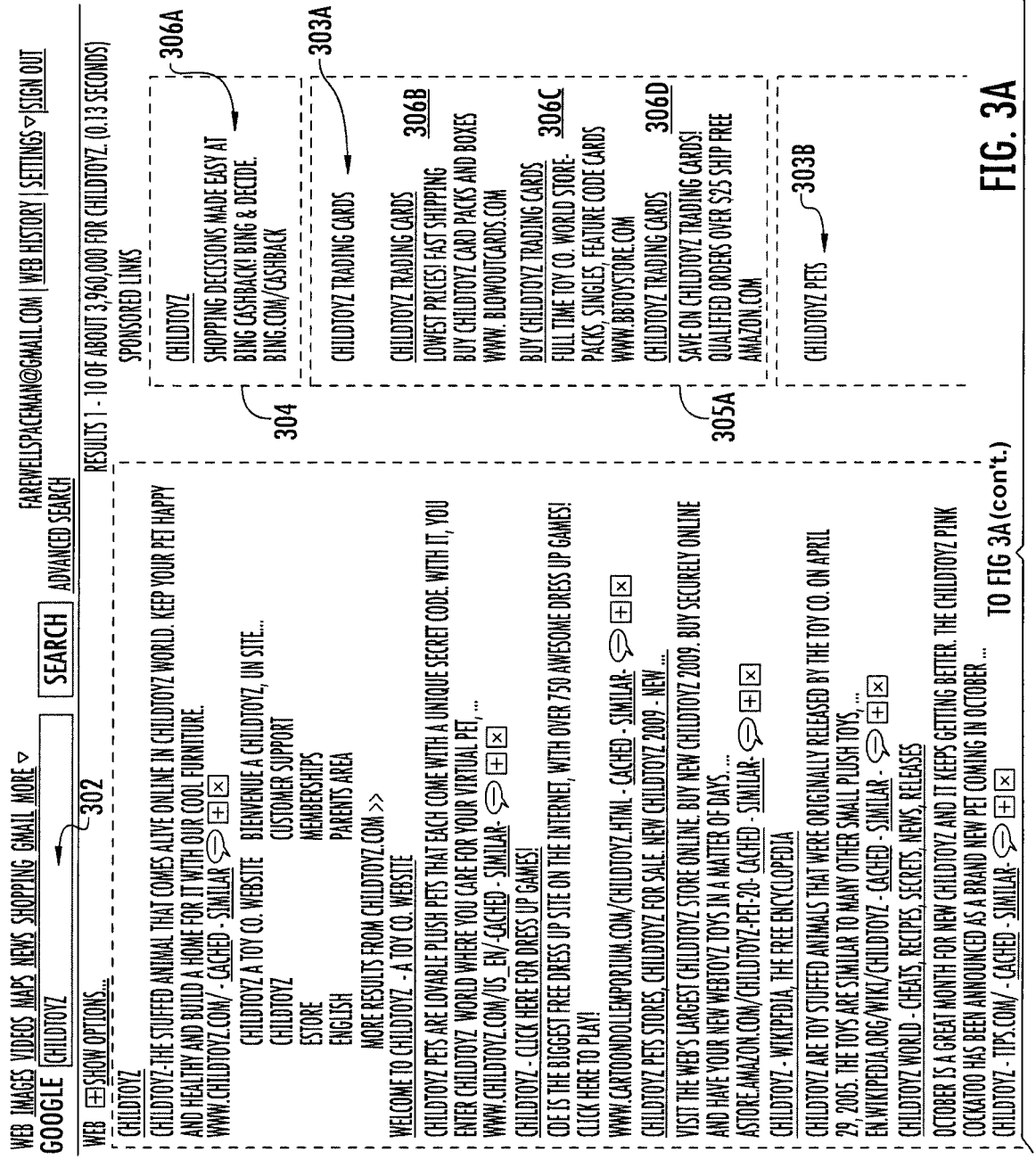

In FIG. 3A, the search engine results page 300 includes a search results block 301 that includes search results that a search engine has identified as being relevant to the initial query 302 (in the figure, "childztoyz"). The search engine results page also includes references 303A to 303C to each additional query (in the figure, "childztoyz trading cards," "childztoyz pets," and "childztoyz charms," respectively). The search engine results page 300 also includes an advertising block 304 that includes an advertisement 306A that is targeted to the initial query 302, an advertising block 305A that includes reference 303A and advertisements 306B-D that are targeted to the additional query 303A, an advertising block 305B that includes reference 306B and advertisements 306E-F that are targeted to the additional query 303B, and an advertising block 305C that includes reference 303C and advertisements 306G-H that are targeted to the additional query 303C. Notably, the search engine results page 300 does not include a reference that references the initial query 302 directly above the advertising block 304. The additional advertising blocks may be displayed in order of, for example, relevance of each additional query to the initial query, historical click through rate for the ads in each ad block, number of ads available for each ad block, random placement, and the like.

In FIG. 3B, the search engine results page 310 includes a search results block 311 that includes search results that a search engine has identified as being relevant to the initial query 312 (in the figure, "childztoyz"). The search engine results page also includes references 313A-C to each additional query (in the figure, "childztoyz trading cards," "childztoyz pets," and "childztoyz charms," respectively). The search engine results page 310 also includes an advertising block 314 that includes an advertisement 316A that is targeted to the initial query 312, an advertising block 315A that includes the reference 313A and advertisements 316B-D that are targeted to the additional query 313A, an advertising block 315B that includes reference 313B and advertisements 316E-F that are targeted to the additional query 313B, and an advertising block 315C that includes the reference 313C and advertisements 316G-H that are targeted to the additional query 313C.

Notably, and instead of merely including static textual data, the references 313A-C each defines a hyperlink that, when selected by the user, initiate a new search query using the additional query. Moreover, the advertising blocks 315A-C include controls 317A-C, respectively, that, when selected, cause additional advertisements that are targeted to the corresponding additional queries to be obtained and/or displayed, or that cause some advertisements to be obtained or displayed if none are shown. Although the controls 317A-C are illustrated as user-selectable boxes that reveal additional content to the user (sometimes referred to as a "plusbox"), other types of controls may also be used.

Figure 3C:
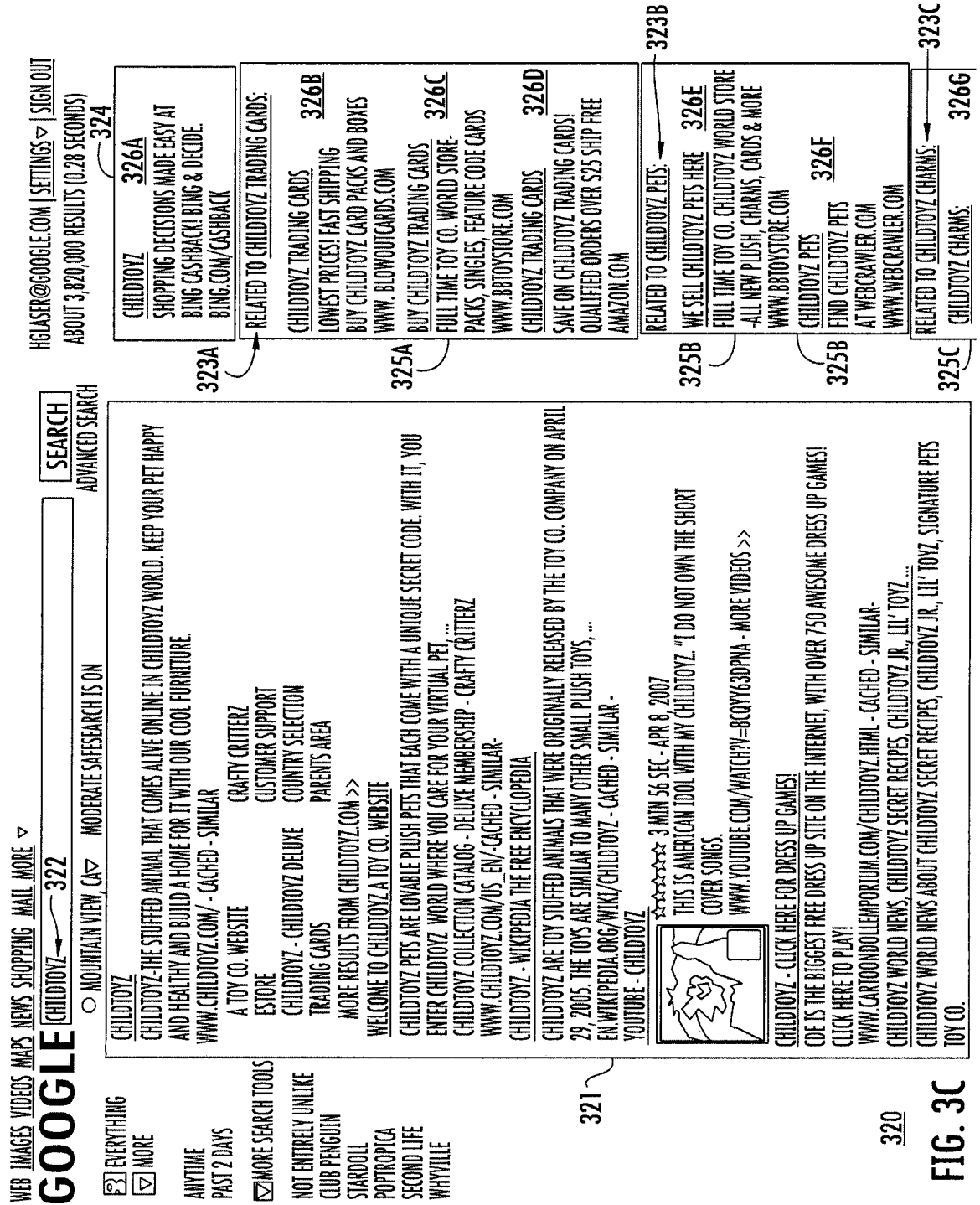

In FIG. 3C, the search engine results page 320 includes a search results block 321 that includes search results that a search engine has identified as being relevant to the initial query 322 (in the figure, "childztoyz"). The search engine results page also includes references 323A-C to each additional query (in the figure, "childztoyz trading cards," "childztoyz pets," and "childztoyz charms," respectively). The search engine results page 320 also includes an advertising block 324 that includes an advertisement 326A that is targeted to the initial query 322, an advertising block 325A that includes the reference 323A and advertisements 326B-D that are targeted to the additional query 323A, an advertising block 325B that includes the reference 323B and advertisements 326E-F that are targeted to the additional query 323B, and an advertising block 325C that includes the reference 323C and advertisement 326G that is targeted to the additional query 323C. Notably, the references 323A-C are, in some implementations, displayed in a larger font than the references 313A-C of FIG. 3B, to allow the user to see the additional queries more easily.

Figure 3D:
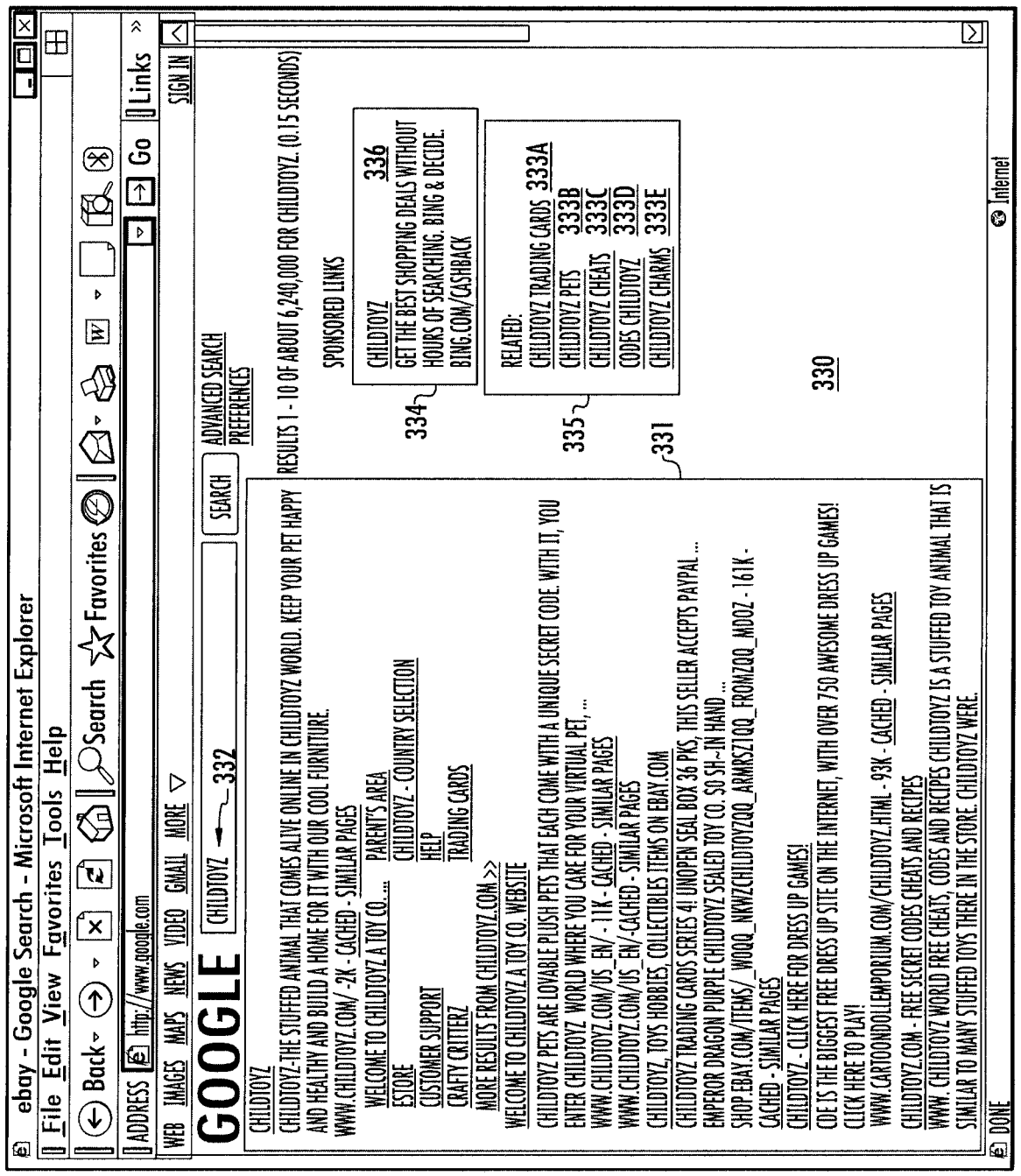

In FIG. 3D, the search engine results page 330 includes a search results block 331 that includes search results that a search engine has identified as being relevant to the initial query 332 (in the figure, "childztoyz"). The search engine results page also includes references 333A-E to each additional query (in the figure, "childztoyz trading cards," "childztoyz pets," "childztoyz cheats," "codes childztoyz," and "childztoyz charms," respectively). The search engine results page 330 also includes an advertising block 334 that includes an advertisement 336 that is targeted to the initial query 332.

The search engine results page 330 also includes a suggested query term block 335 that references the additional queries 333A-E, however the suggested query term block 335 does not include advertisements or advertisement blocks that are targeted to the additional queries 333A-E. The auction engine, advertisement selector engine, or mixer engine may choose to not include advertising blocks if an insufficient number of advertisements are located, or if, for example, the selected advertisements do not satisfy predetermined relevancy and/or diversity scores. For example, advertisements may not be included in the search engine results page 330 if the auction engine, advertisement selector engine, or mixer engine determine that the revised queries do not share a common context, i.e., a semantic drift has occurred. Semantic drift can be determined by, for example, a particularly low relevance or low click-through-rate for a particular revised query with respect to an initial query.

Figure 3E:
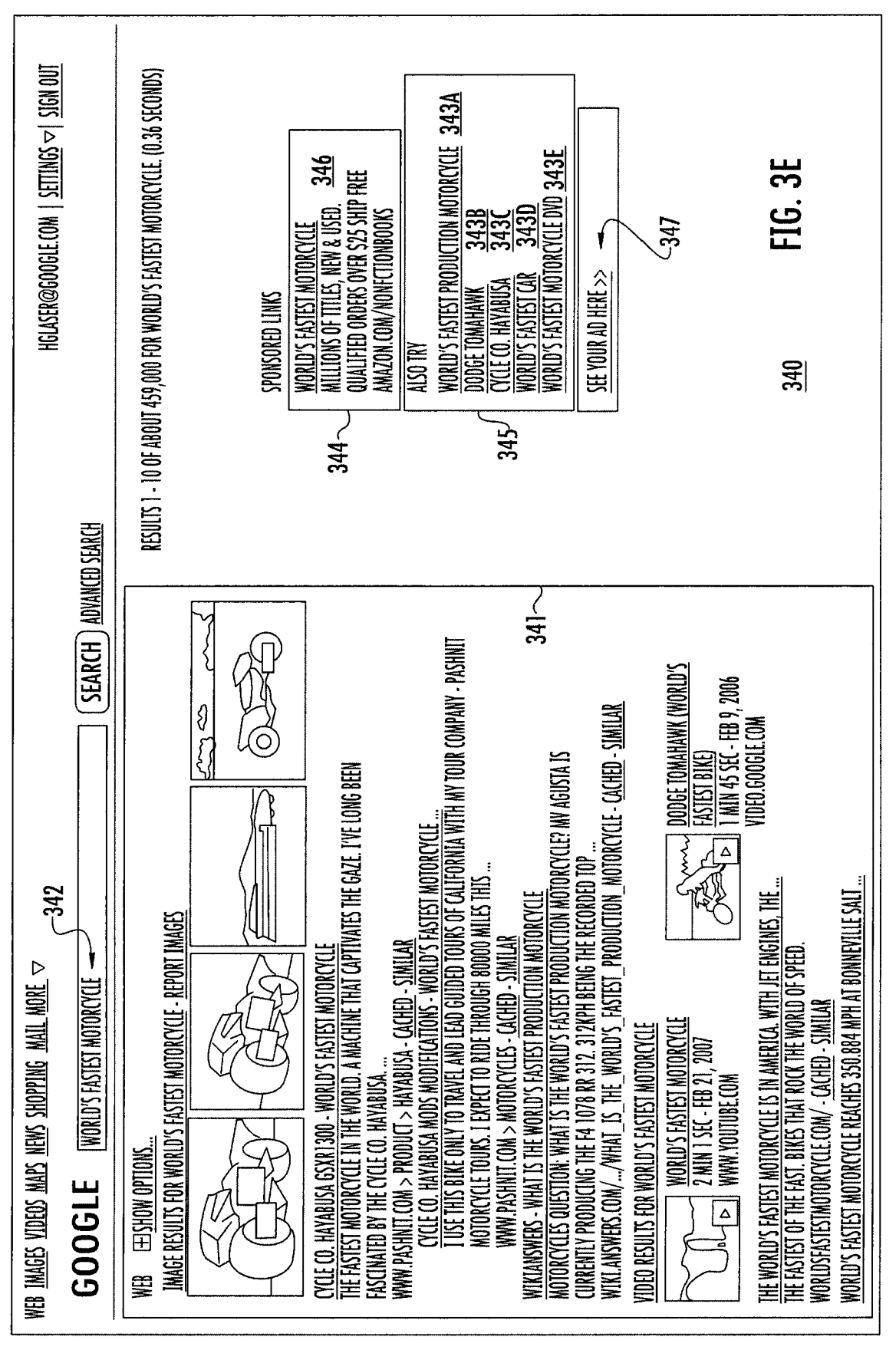

In FIG. 3E, the search engine results page 340 includes a search results block 341 that includes search results that a search engine has identified as being relevant to the initial query 342 (in the figure, "world's fastest motorcycle"). The search engine results page also includes references 343A-E to each additional query (in the figure, "world's fastest production motorcycle," "dodge tomahawk," "Suzuki hayabusa," "world's fastest car," and "world's fastest motorcycle DVD," respectively). The search engine results page 340 also includes an advertising block 344 that includes an advertisement 346 that is targeted to the initial query 342.

The search engine results page 340 also includes an additional query block 345 that references the additional queries 343A-E, however the additional query block 345 does not include advertisements that are targeted to the additional queries 343A-E. The auction engine, advertisement selector engine, or mixer engine may choose to not include advertising blocks if, for example, an insufficient number of advertisements are located, or if the selected advertisements do not satisfy predetermined relevancy and/or diversity scores. For example, advertisements may not be included in the search engine results page 340 if the auction engine, advertisement selector engine, or mixer engine determine that the revised queries do not share a common context, i.e., a semantic drift has occurred. Notably, however, the search engine results page 340 includes an auction participation link 347 that, when selected by the user, establishes a dialogue to invite the user to submit advertisements that may be displayed in an advertisement block for future search queries.

As described above, additional queries can be provided in response to receipt of an initial query. One or more additional content items can be provided with each of the additional queries forming a content block. How particular additional queries, associated content items and blocks are selected can be achieved, for example by way of a selection process. Example selection processes, including example auction processes are described in greater detail below in association for FIGS. 4-6.

Figure 4:
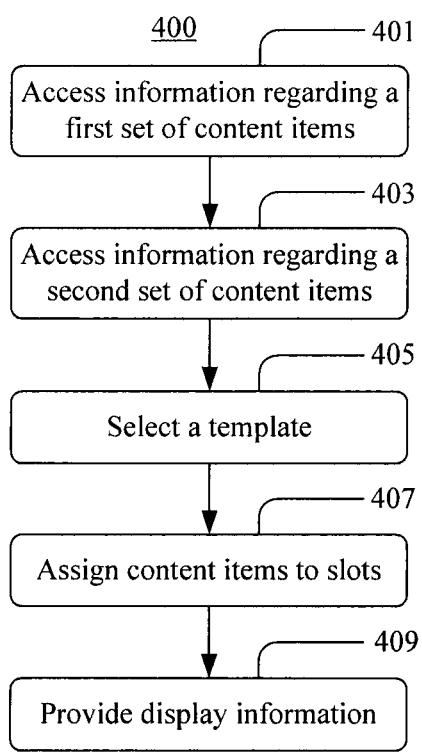
FIG. 4 is a diagram illustrating a process for providing content item display information.

Information regarding the subset of the candidate advertisements can be provided according to a process 400 illustrated in FIG. 4. In the process 400, information regarding a first set of content items is accessed (401) and information regarding a second set of content items is accessed (403). The accessed information can include content item distribution information, such as information selected by a content item provider. For example, the content item distribution information can include value information regarding a value that the content item provider places on distribution of the content item, such as a bid price. Additionally, the distribution information includes targeting information, such as one or keywords or topical information that was used to determine that the content item is an appropriate candidate for distribution. A content item distribution template that controls a format of a display of content items is selected (405) and content items are assigned to content item slots of the template (407). For example, the template can include blocks or regions that define an area of a display within which content items targeted to a common keyword are to be displayed. Each block or region can include a single slot in which a single content item is displayed, or multiple slots such that multiple content items are displayed in the block. In some implementations, the slots can define sub-areas within the block and/or different periods of time. Thus, the blocks and slots can represent portion of a screen, periods of time, or combinations of these. Display information regarding selected content items, such as information regarding the selected template and the content item assignments, is provided (409) for use in generating a display that includes the assigned content items in their assigned slots of the selected template.

Figure 6:
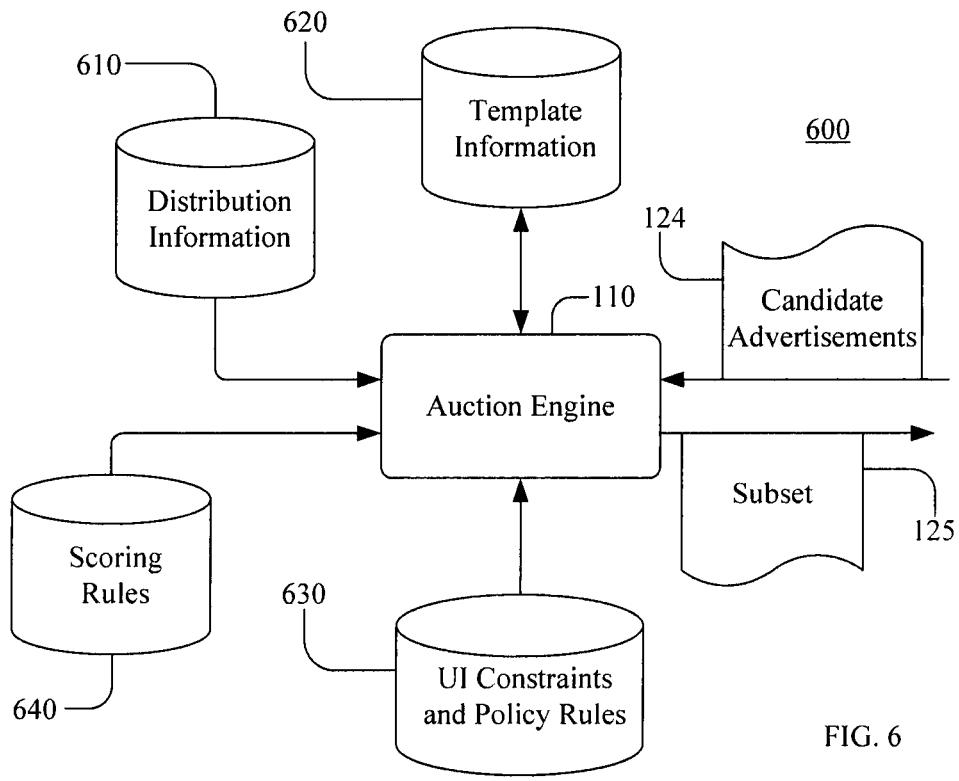
FIG. 6 is diagram illustrating a system for providing content item display information.

For example, the process 400 can be performed by the auction engine 110 within a system 600 of FIG. 6 to provide the information regarding the selected subsets of the candidate advertisements 125 to the mixer engine 106. As described above with reference to FIG. 1, the system 600 can include the auction engine 110 that receives information regarding candidate advertisements 124 from the mixer engine 106 and returns information regarding a selected subset of the candidate advertisements 125 to the mixer engine 106. In some implementations, the information regarding the one or more candidate advertisements 124 includes information identifying each candidate advertisement, distribution information, such as a bid price for a query to which the candidate advertisement is targeted and targeting information, such as the query for which the candidate advertisement was identified as a candidate advertisement and an indication regarding whether the query is the initial query 121 or an additional query 122.

In some implementations, the information regarding the one or more candidate advertisements 124 can include less information, such as only an advertisement identifier, a keyword, and a keyword type or other information indicating whether the keyword was the initial keyword(s) or an additional keyword(s). The advertisement identifier can be used to retrieve additional information associated with the advertisement from a content item distribution repository 610 or other storage repository that includes, for example, bid prices for keywords. Similarly, the information regarding the one or more candidate advertisements 124 and/or the content item distribution information repository 610 can include additional information. For example, performance information, such as a click-through rate associated with each advertisement and optionally each keyword to which the advertisement is targeted, can be included and/or information regarding performance modifiers, such as other advertisements that positively or negatively affect the performance of an advertisement can be included. The performance information can be generated manually, such as based on user experience or belief, and/or can be derived through statistical or other analysis of historical information regarding to past distribution of content items.

After the auction engine 110 receives information regarding the one or more candidate advertisements 124 from the mixer engine 106, the auction engine accesses the information regarding the one or more advertisements that are targeted to the initial query 121 and accesses information regarding the one or more advertisements that are targeted to the additional queries 122. For example, the information regarding the one or more candidate advertisement that are targeted to the initial query and the additional queries can include, for each candidate advertisement, information regarding a bid price, a click-through rate, a targeted query, and a relevance score that indicates a relevance of the advertisement to the targeted query.

The one or more advertisements that are targeted to the initial query 121 are counted and the tagged as the first set of content items having m candidates. Similarly, the one or more advertisements that are targeted to a first additional query term 122 are counted and tagged as a second set of content items having n candidates. This process is continued until all of the candidate advertisements for all of the additional queries have been counted and tagged. In some implementations, an advertisement can be targeted to two or more of the queries and can be included in two or more of the sets of content items. Optionally, such advertisements can be marked as conditional candidates such that assignment of the advertisement to a slot in a block of the template associated with one of the keywords causes the conditional candidates to be removed from other sets of content items.

The tagged sets of content items are used to select a template, and the template can be selected according to the process 500 illustrated in FIG. 5, discussed in greater detail below. After selecting the template, the auction engine 110 assigns selected ones of the candidate advertisements with slots of the selected template and provides display information regarding the candidate advertisement slot assignments to, for example, the mixer engine 106 for use in generating a display of the selected advertisements to a user. For example, different ones of the candidate advertisements can be combined in different orders to fill the slots of one or more templates, and the different versions, or instantiations, of the templates can be compared to select a template for display. In some implementations, assigning the advertisements to the slots of the selected template can be performed including storing the associations of the individual advertisements and the individual slots of the template. As mentioned above, the display information can be provided as the information regarding the subsets of advertisements 125. For example, the information regarding the subsets of advertisements 125 can include template configuration information that can be provided, for example, as a tuple of positive integers, such as 4, 3, 3, 4, and a list of advertisement identifiers. The first integer of the tuple can represent a number of slots of a first block, the second integer can represent the number of slots in a second block, and the $i^{th}$ number represents the number of slots of the $i^{th}$ block. In some implementations, formatting rules allow the tuple of integers to sufficiently describe the layout of a display associated with the template, such as where all of the blocks are listed on a right-hand side of a web page with the first block at the upper-most available position and with the following blocks being arranged in order below the first block, although template layout information can also be provided in the information regarding the subsets 125. The list of advertisement identifiers can be used to display the advertisements in the assigned slots based on a display rule and/or layout information included in the information 125. For example, the advertisements can be displayed with the advertisements of the list displayed in order, beginning with the first advertisement being displayed in the first slot of the first block, the next advertisement being displayed in the next slot of the first block, and then proceeding to fill subsequent blocks after all the slots of the first block are filled.

Figure 5:
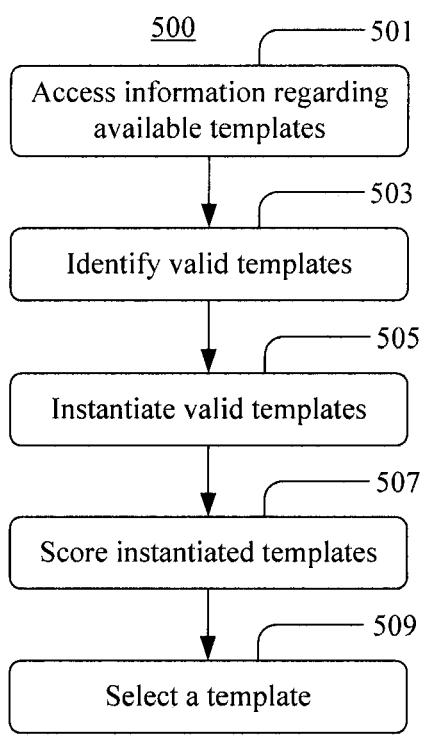
FIG. 5 is a diagram illustrating a process for selecting a content item display template.

Now referring to FIG. 5, the auction engine 110 accesses template information regarding candidate templates (501), identifies valid templates (503), instantiates the valid templates (505), scores the instantiated templates (507) and selects a template based on the scores (509). In some implementations, the auction engine 110 accesses the template information repository 620 to retrieve information regarding pre-generated templates, such as information regarding all possible template configurations. In some implementations, the auction engine 110 identifies valid templates based on information regarding user interface constraints and/or information regarding policy rules that is stored in and accessible from a template formatting information repository 630. For example, the auction engine 110 can determine that, because a policy rule requires that the second block associated with the additional query have at least 2 slots and not more than 6 slots, only template configurations having between 2 and 6 slots in the second block are valid.

The auction engine 110 can also identify valid templates based on the information regarding the candidate advertisements 124. For example, if the information regarding the one or more candidate advertisements 124 indicates that there are m candidate advertisements for assignment to slots in a first block associated with the initial query and that there are n candidate advertisements for assignment to slots in a second block associated with an additional query, the auction engine 110 can determine that only templates having fewer than m slots for the first block and fewer than n slots for the second block are valid. Combinations of factors of the user interface constraints and/or policy preferences and the information regarding the candidate advertisements 124 can also be used to identify valid templates. For example, if n, the number of candidate advertisements for slots in the second block, is equal to 5, the auction engine 110 can further determine that only template configurations having between 2 and 5 slots for the second block are valid.

Other policy rules or user interface constraints can indicate, for example, that a valid configuration can have no more than 8 slots in total, that the first block must always be located in a pre-determined position, such as first in an ordered list, or that a block associated with an additional keyword that is most closely related to the initial keyword must be separated from the block associated with the initial keyword by one or more blocks, if possible (or, conversely, must not be separated from the block associated with the initial keyword). As illustrated in these examples, the user interface constraints and/or policy rules can define valid and/or preferred template configurations based one or more of a variety of parameters, including total or relative number of blocks and/or slots, absolute or relative position of blocks and/or slots, or order of blocks and/or slots, among others.

Alternatively, the auction engine 110 can generate template information regarding candidate templates and store the template information, at least temporarily, in the template information repository 620. For example, the auction engine 110 can generate the candidate template information by generating all possible template configurations that are valid based on the information regarding user interface constraints, the policy rules, and/or the information regarding the candidate advertisements 124.

The auction engine 110 instantiates the valid templates by, for example, associating keywords with the blocks of the templates and associating candidate advertisements that are targeted to a keyword to slots of the corresponding blocks. For example, all possible permutations of block associations and content item associations can be determined. This process can be pruned to avoid determining permutations that render the templates invalid. For example, as mentioned above, a policy rule can require that the initial query always be assigned to an upper-most block in a column of blocks arranged on a right-hand side of a web page display. In this case, any permutations of associations that do not include an association of the initial keyword with the upper-most block can be skipped or simply not determined as a possible permutation.

In some implementations, the process of instantiation is further pruned based on one more policy rules. For example, the auction engine 110 can rank the candidate advertisements associated with a given keyword, and always associate the candidate advertisements with the slots of an associated block of a template based on the rankings. One example is where the candidate advertisements are ranked according to value, which can be represented by the product of a bid price and a relevancy score, by a bid price alone, by a relevancy score alone, or by a function of other factors, such as advertisement quality, for example. In some implementations, the value is represented by the product of a bid price, a relevancy factor, and a click-through rate. Another example of the instantiation process that is performed based, at least in part on one or more rules, involves removing candidate advertisements from unassigned slots of unfilled blocks based on information regarding the advertisements, such as a top-level domain of a hypertext link associated with an advertisement that is associated with another slot of the block or with a slot of another block. Similarly, a candidate advertisement can be removed from its set of candidate advertisements based on association of an advertisement with a slot that has a provider that is the same as the provider of the candidate advertisement, that has a provider that conflicts with the provider of the candidate advertisement, or based on another rule. For example, the auction engine may prevent more than a selected number of advertisements from a single provider in a block and/or in an instantiation of a template.

The auction engine 110 scores the instantiated templates based on information regarding the candidate advertisements associated with the slots of the templates and one or more scoring rules stored in a scoring rule repository 640. In some implementations, the instantiated template for use in generating a display of content items is selected based at least in part on the scores, such as where the instantiation with the highest score is selected. For example, the auction engine 110 can score the instantiated templates by finding the sum of score components for each advertisement associated with a slot of the template. In some implementations, the score components are equal to the product of the bid price associated with the advertisement, the click-through rate of the advertisement, a quality score of the advertisement with respect to the targeted keyword, and a position normalizer. The position normalizer can be a constant that is associated with the slot based on a relative position of the slot within the block and/or based on a relative position of the block relative to other blocks and/or other content. For example, the position normalizer can be a number that is not greater than one and is greater than zero, and can be determined by a function that results in a smaller constant being associated with a slot that is below another slot in a block. Additionally, in some implementations, the constant associated with any slot of one block is equal to or smaller than any constant associated with any slot of a higher block. This example position normalizer reflects an assumption that slots in higher positions within blocks are valued higher than lower slots in the block and that slots in higher blocks are valued higher than slots in lower blocks.

A number of implementations have been described. Nevertheless, it will be understood that various modifications may be made without departing from the spirit and scope of the disclosure. For example, various forms of the flows shown above may be used, with steps re-ordered, added, or removed. Similarly, additional information, factors, and/or operations can be included. For example, information regarding a user that supplied the initial query or other targeting object can be used to target content items for distribution in association with the keyword based at least in part on user preferences, demographics, profile information, historical activity information, or based on other factors. Additionally, while distribution of advertisements on search engine results web pages is described. Other content items can be distributed with other content based on targeting information as described above. Accordingly, other implementations are within the scope of the following claims.

Figure 7:
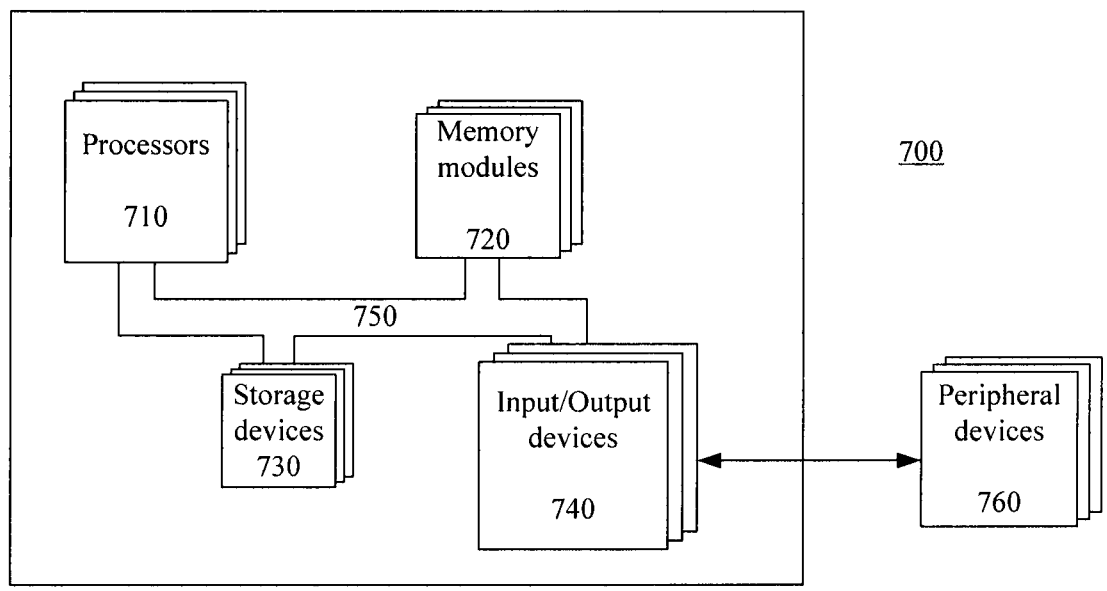
FIG. 7 is a diagram illustrating a computer system.

Now referring to FIG. 7, a computer system 700 includes one or more processors 710, one or more memory modules 720, one or more storage devices 730, and one or more input/output devices 740, and a system bus 750. The one or more input/output devices 750 are operable with one or more peripheral devices 760 for inputting signals to and/or for receiving signals from the computer system 700. One or more of the input/output devices 740 can be operable to allow the computer system 700 to communicate with one or more other computer systems or components over a computer network, such as the network 104 of FIG. 1, which can include the Internet and/or other communications networks.

Embodiments and all of the functional operations described in this disclosure may be implemented in digital electronic circuitry, or in computer software, firmware, or hardware, including the structures disclosed in this disclosure and their structural equivalents, or in combinations of one or more of them, such as one or more computer systems 300 and/or one or more components thereof. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode data for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display)

monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims.

For example, the actions recited in the claims may be performed in a different order and still achieve desirable results.

The invention claimed is:

1. A system comprising:
a search system front end server that routes a given query to one or more computing devices that generate a response to the query; and
one or more servers that select various portions of content to be incorporated into a search results page generated and provided responsive to the given query, wherein the one or more servers are configured to perform operations including:
selecting one or more portions of first content based on the given query;
selecting one or more portions of second content based on a previous query that was previously submitted by the user prior to submission of the given query, wherein the previous query is a different query than the given query; and
generating machine executable code that incorporates visual representations of the first content and the second content within the search results page, wherein the search system front end uses the machine executable code to remotely update a display of a client device that submitted the given query to present the search results page including the visual representations of the first content and the second content in separate slots of a template for the search results page, wherein content selected using different queries is visually separated using a first separate slot that presents the first content selected based on the given query that is visually delineated from a second separate slot that presents the second content selected based on the previous query that was submitted by the user prior to submission of the given query.

2. The system of claim 1, wherein the machine executable code comprises code that generates a visual representation of text specifying whether a given portion of the first content and the second content was selected using the given query or the previous query that was previously submitted by the user prior to submission of the given query.

3. The system of claim 1, wherein the one or more servers select a search results page template that is populated with the portions of the first content and the second content to create the search results page.

4. The system of claim 3, wherein the one or more servers selects the search results page template by performing operations comprising:
identifying valid templates based on information regarding one or more of user interface constraints and policy rules for template formatting;
instantiating the valid templates using the information associated with the portions of the first content and the second content; and assigning a score to an instantiated template based on the information associated with the portions of the first content and the second content with the instantiated template.

5. The system of claim 4, wherein the policy rules define valid or preferred template configurations based on one or more of a number, order, size, or position of slots or blocks of the template.

6. The system of claim 1, wherein the one or more servers select additional content to be incorporated into the search results page using an additional query created based on relevance or diversity of the additional query to the given query.

7. The system of claim 1, wherein the portions of the first content and the second content comprise an identifier used for retrieving additional information associated with candidate portions of content from a repository.

8. A method comprising:
routing, by a search system front end server, a given query to one or more computing devices that generate a response to the query;
selecting, by one or more servers, various portions of content to be incorporated into a search results page generated and provided responsive to the given query;
selecting, by the one or more servers, one or more portions of first content based on the given query;
selecting, by the one or more servers, one or more portions of second content based on a previous query that was previously submitted by the user prior to submission of the given query, wherein the previous query is a different query than the given query; and
generating, by the one or more servers, machine executable code that incorporates visual representations of the first content and the second content within the search results page, wherein the search system front end uses the machine executable code to remotely update a display of a client device that submitted the given query to present the search results page including the visual representations of the first content and the second content in separate slots of a template for the search results page, wherein content selected using different queries is visually separated using a first separate slot that presents the first content selected based on the given query that is visually delineated from a second separate slot that presents the second content selected based on the previous query that was submitted by the user prior to submission of the given query.

9. The method of claim 8, wherein the machine executable code comprises code that generates a visual representation of text specifying whether a given portion of the first content and the second content was selected using the given query or the previous query that was previously submitted by the user prior to submission of the given query.

10. The method of claim 8, further comprising selecting a search results page template that is populated with the portions of the first content and the second content to create the search results page.

11. The method of claim 10, wherein selecting the search results page template comprises:
identifying valid templates based on information regarding one or more of user interface constraints and policy rules for template formatting;
instantiating the valid templates using the information associated with the portions of the first content and the second content; and assigning a score to an instantiated template based on the information associated with the portions of the first content and the second content with the instantiated template.

12. The method of claim 11, wherein the policy rules define valid or preferred template configurations based on one or more of a number, order, size, or position of slots or blocks of the template.

13. The method of claim 8, further comprising selecting additional content to be incorporated into the search results page using an additional query created based on relevance or diversity of the additional query to the given query.

14. The method of claim 8, wherein the portions of the first content and the second content comprise an identifier used for retrieving additional information associated with candidate portions of content from a repository.

15. One or more machine-readable hardware storage devices storing instructions that are executable by one or more processing devices cause the one or more processing devices to perform operations comprising:
routing a given query to one or more computing devices that generate a response to the query;
selecting various portions of content to be incorporated into a search results page generated and provided responsive to the given query;
selecting one or more portions of first content based on the given query;
selecting one or more portions of second content based on a previous query that was previously submitted by the user prior to submission of the given query, wherein the previous query is a different query than the given query; and
generating, by the one or more servers, machine executable code that incorporates visual representations of the first content and the second content within the search results page, wherein the search system front end uses the machine executable code to remotely update a display of a client device that submitted the given query to present the search results page including the visual representations of the first content and the second content in separate slots of a template for the search results page, wherein content selected using different queries is visually separated using a first separate slot that presents the first content selected based on the given query that is visually delineated from a second separate slot that presents the second content selected based on the previous query that was submitted by the user prior to submission of the given query.

16. The one or more machine-readable hardware storage devices of claim 15, wherein the machine executable code comprises code that generates a visual representation of text specifying whether a given portion of the first content and the second content was selected using the given query or the previous query that was previously submitted by the user prior to submission of the given query.

17. The one or more machine-readable hardware storage devices of claim 15, wherein the instructions cause the one or more processing devices to perform operations further comprising selecting a search results page template that is populated with the portions of the first content and the second content to create the search results page.

18. The one or more machine-readable hardware storage devices of claim 17, wherein selecting the search results page template comprises:
identifying valid templates based on information regarding one or more of user interface constraints and policy rules for template formatting;
instantiating the valid templates using the information associated with the portions of the first content and the second content; and assigning a score to an instantiated template based on the information associated with the portions of the first content and the second content with the instantiated template.

19. The one or more machine-readable hardware storage devices of claim 18, wherein the policy rules define valid or preferred template configurations based on one or more of a number, order, size, or position of slots or blocks of the template.

20. The one or more machine-readable hardware storage devices of claim 15, wherein the instructions cause the one or more processing devices to perform operations further comprising selecting additional content to be incorporated into the search results page using an additional query created based on relevance or diversity of the additional query to the given query.

* * * * *